United States Patent [19]

Klimpl

[11] Patent Number: 4,484,969
[45] Date of Patent: Nov. 27, 1984

[54] METHOD OF WINDING TILE-LINED PIPED WITH SUBDIVIDED TILES THEREIN

[75] Inventor: Fred E. Klimpl, 20 Hampton Rd., Great Neck, N.Y. 11020

[73] Assignee: Koch Engineering Co., Inc., Wichita, Kans.

[21] Appl. No.: 428,176

[22] Filed: Sep. 29, 1982

[51] Int. Cl.³ ............................................. B65H 81/00
[52] U.S. Cl. .................................... 156/171; 156/250; 156/297; 156/428; 156/510
[58] Field of Search ............... 156/184, 171, 172, 173, 156/187, 195, 192, 293, 297, 169, 250, 510, 257, 428, 429, 430; 138/153, 140, 172, 174, 175, 177, 178, 144, 141, 145; 52/600, 602, 245; 225/4

[56] References Cited

U.S. PATENT DOCUMENTS

| | | | |
|---|---|---|---|
| 317,530 | 5/1885 | Grubb | 156/171 |
| 1,027,571 | 5/1912 | Siegwart | 156/172 |
| 3,042,562 | 7/1962 | Peterson | 156/257 |
| 3,960,630 | 6/1976 | Pataki et al. | 138/153 |
| 4,155,377 | 5/1979 | Suzuki et al. | 138/149 |

Primary Examiner—Michael Ball
Attorney, Agent, or Firm—Posnack, Roberts, Cohen & Spiecens

[57] ABSTRACT

A tile-lined pipe and its method of manufacture comprising a tubular pipe member having a layer of tile elements on the inner surface to form a lining therefor. The tile elements extend one after another along helical lines and are formed by subdividing larger tiles transversely along score lines so that the adjoining faces of the subdivided tiles will be in closely conforming adjoining relation.

6 Claims, 7 Drawing Figures

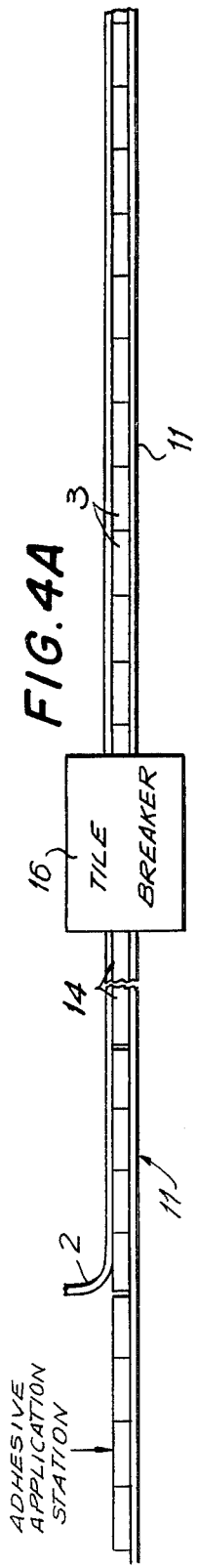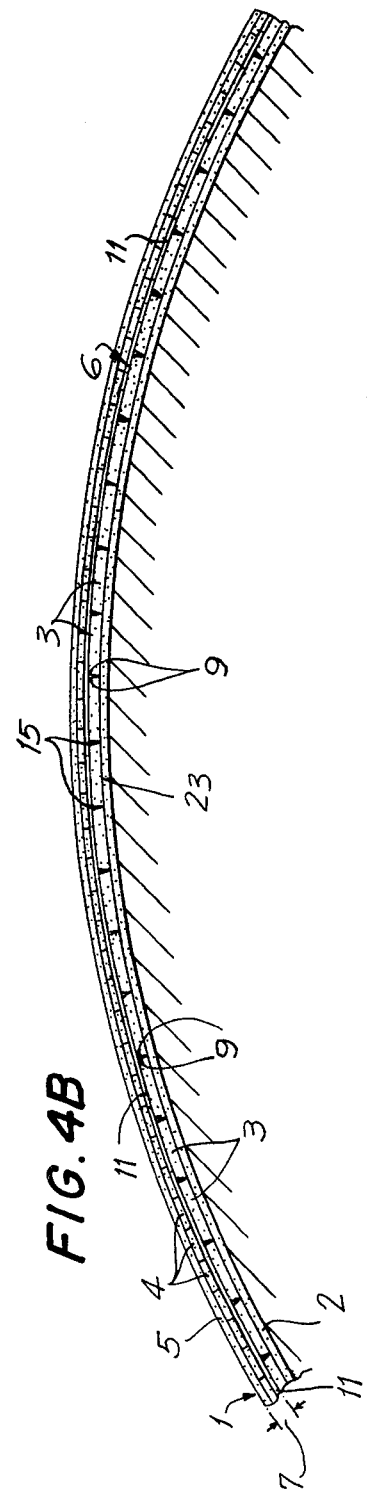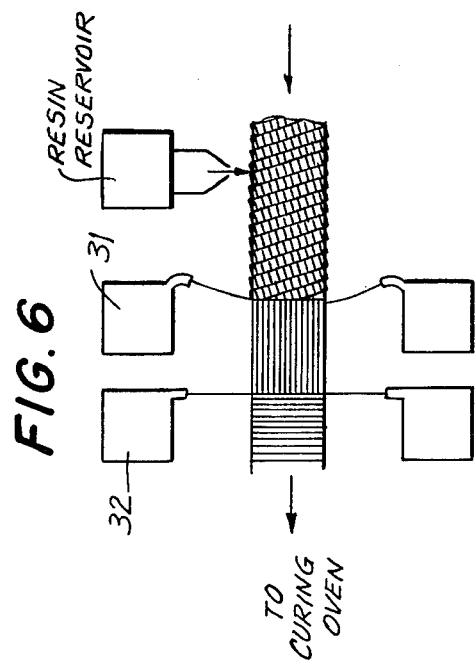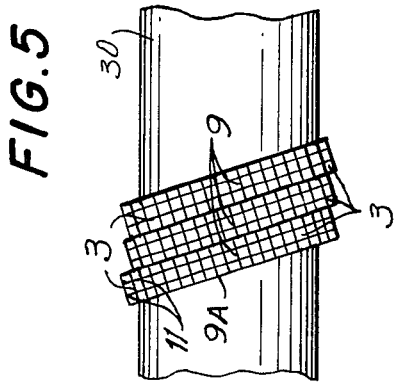

METHOD OF WINDING TILE-LINED PIPED WITH SUBDIVIDED TILES THEREIN

FIELD OF THE INVENTION

The invention relates to a tile-lined pipe and its method of production. In particular, the invention is concerned with pipes whose inner lining is formed by tiles of high hardness and resistance.

BACKGROUND

It is known to convey abrasive or corrosive slurries in a pipe which must be capable of resisting sliding or frictional forces and, also, capable of absorbing the impact energy of travelling particles.

It is known to disperse hard particles in a fiberglass-reinforced epoxy resin layer to form a hard inner surface for the resulting pipe. Such a random dispersal results in a surface having 20–50% silicon carbide particles. Such a surface is not sufficient to resist highly abrasive and corrosive slurries.

SUMMARY OF THE INVENTION

In the formation of pipes for conveying abrasive or corrosive slurries, the tiles of the lining are closely adjacent one another so as not to form any gaps which would allow particles to penetrate therein and adversely affect the integrity of the pipe.

The tiles are joined to the pipe by a resin which is relatively hard but this is nevertheless much softer than the hardness of the tiles themselves. Thus, any gaps between tiles forms a weakness zone which can rapidly lead to deterioration of the pipe when subjected to especially abrasive or corrosive slurries.

Abrasion within the pipe is caused by both impact and sliding or frictional forces. When the abrasion effects occur simultaneously with corrosion effects, their combination acts to intensify the degradation of the pipe substantially reducing its service life.

A truly abrasion and corrosion resistant pipe must have an internal surface that is inert to both chemical and electrolytic forms of corrosion while, additionally, it must be resilient enough to absorb the impact energy of the travelling particles. Furthermore, the inside of the pipe must be extremely hard to resist the abrasion caused by particles sliding at high velocities.

An object of the invention is to provide a pipe which will satisfy the requirements concerning hardness and abrasion and corrosion resistance.

A further object of the invention is to provide a pipe of the above type in which the internal surface of the pipe is lined with closely adjoining tile elements.

A further object of the invention is to dispose the tile elements so that they are immediately adjoining one another and do not provide any site in which abrasive particles can enter to upset the integrity of the abrasion and corrosion resistant surface.

Yet, another object of the invention is to provide a pipe in which the tile elements are formed by subdividing tiles so that the mating surfaces of the tile elements will be immediately adjacent one another It is another object of the invention to provide a method for forming the pipe in which the tile elements are formed by scoring tiles and breaking the tiles along the score lines.

The method of producing a tile-lined pipe according to the invention comprises adhering tiles in adjoining relation one after another on a longitudinal substrate and subdividing each of the tiles transversely in situ on the substrate in order to form successive tile elements from each tile. Thereby, each tile element closely conforms to its adjacent tile element along adjoining division edges. The pipe is formed with the tile elements lining the inner surface of the pipe.

In further accordance with the invention, the formation of the pipe is effected by winding the substrate on a mandrel coated with resin and winding filaments on the tile elements such that the filaments and tile elements are integrally joined to form the pipe. Thereafter, the mandrel is removed.

It is a feature of the method of the invention that the substrate on which the tiles are adhered is made from stretchable material to allow the closely adjoining faces of the adjacent tile elements to be slightly separated when the substrate is wound on the mandrel.

In accordance with a further feature of the invention, in order to facilitate subdivision of the tiles, transverse score lines are preliminarily formed in the tiles and these are subdivided, in situ, on the substrate by applying force to the tiles to break the same along the score lines.

The invention also contemplates a tile-lined pipe in which a layer of tile elements adjoin the inner surface of the pipe to form a lining therefor, said tile elements extending one after another along helical lines. Each tile element has at least one face adjoining a face of an adjacent tile element, said adjoining faces being formed by breakage of a tile whereby the faces closely conform to one another.

The invention will be described hereafter in greater detail with reference to a specific embodiment thereof.

BRIEF DESCRIPTION OF THE FIGURES OF THE DRAWING

FIG. 4A is an elevational view showing a succession of tiles before and after breakage thereof in a tile breaker.

FIG. 4B shows the composite arrangement in FIG. 4A wound on a mandrel.

FIG. 5 is an elevational view showing the winding of the substrate and tile elements on the mandrel.

FIG. 6 shows the wound mandrel of FIG. 5 in the course of formation of the pipe thereon.

DETAILED DESCRIPTION

Figure 3:
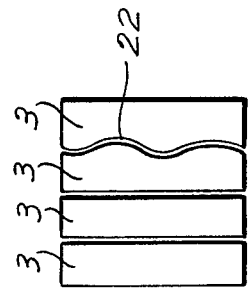
FIG. 3 is a plan view showing irregular breakage of a tile.

Referring to FIG. 4B of the drawing, therein is shown in cross-section the wall 1 of a finished pipe. The wall comprises the following elements from the inner surface to the outer surface: an inner layer or mat or veil 2, a succession of closely adjoining tile elements 3, a tape layer 11, longitudinal fiberglass filaments 4 and outer transverse fiberglass filaments 5. The entire assembly is saturated with and bonded by a resin 6 which integrates the tile elements and filaments into wall 1 of the pipe in which the tile elements serve as an inner lining and the resin and filaments 4 and 5 form an outer layer 7. The pipe is intended to transport highly corrosive and abrasive slurries which can wear away the layer 2 even though it is saturated with resin to leave the tile elements 3 as the effective means to resist the corrosive and abrasive action of the slurry. A critical factor in the life of the pipe and its capability of successfully conveying especially abrasive or corrosive slurries is the closely adjoining relation of the tile elements 3 to form a unified surface to resist the abrasive and corrosion effect of the particles in the slurry. The tile elements 3 are formed of extremely hard ceramic material generally comprising between 85 and 95% aluminum oxide. Such a tile element has a hardness value of 9 on the MOHS scale of hardness. Moreover, the ceramic material provides a smooth interior with a Hazen-Williams factor of 150 to allow the slurry material to travel through the pipe with a minimum of resistance thereby yielding maximum flow line capacity. In order for the tile elements to resist the impact energy of the traveling particles in the slurries they should also be resilient. However, tile elements of aluminum oxide are relatively rigid and lack resilience. In order to provide the necessary resilience to resist impact of the particles, the tile elements 3 are integrated in the pipe by the resin 6 which forms layer 7 containing the filaments 4 and 5, the resin of the layer 7 and the filaments 4 and 5 providing resilient support for the tile elements 3 to allow the tile elements 3 to resist the impact forces of the particles in the slurry by the conjoint effect of the hardness of the tile elements and the resilience of the layer 7. In a typical embodiment, the tile elements 3 can have a thickness of between $\frac{1}{8}''$ and $1''$ and the resin layer has a thickness of between $0.010''$ and $0.100''$ to provide a modulus of elasticity of $33 \times 10^6$ psi for the tile element and a modulus of elasticity of 500,000 psi for the resin layer. The resin is preferably an epoxy, vinyl ester or polyester resin. Thus, even though the tile elements are substantialy rigid, the resin layer serves as a shock-absorber means to permit the tile elements 3 to resist the impact forces.

The invention provides for closely adjoining conforming relation of the edges 9 of adjacent tile elements 3 as will be explained hereafter.

Figure 1:
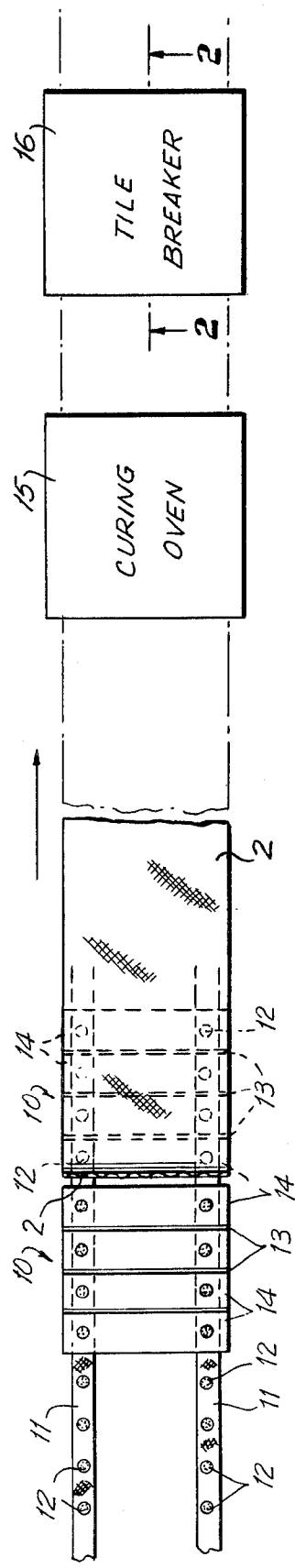
FIG. 1 is a diagrammatic illustration showing the formation of a succession of tile elements on a substrate.

In the formation of the pipe shown in FIG. 4B, tiles 10, as shown in FIG. 1, are placed in succession on longitudinally advancing strips or tapes 11. The composition of the material of tapes 11 may vary, however, they must have stretchability for a reason which will become evident later. The stretchability can be obtained by forming the tapes with resilience such as by making the tapes from a woven cloth of nylon, polyester or fiberglass. Non-woven materials may also be suitable provided they have stretchability. The layer 2 can be made of woven cloth of nylon, polyester or fiberglass.

Regularly deposited on the tapes 11 are quantities of adhesive 12. Each tile 10 is formed with transverse score lines 13 to provide tile sections 14 each of which is destined to form a respective tile element 3 in pipe wall 1. Each tile section 14 rests on an adhesive 12 on each tape 11. The adhesive 12 is a conventional epoxy resin. The tapes 11 with the tiles 10 adhesively secured thereto are advanced through an adhesive application station where adhesive 12 is applied to the upper surface of each of the tile sections 14. Layer 2 is then applied to the upper surface of the tiles 10 at a station downstream of the adhesive application station. The tapes 11 with the tiles 10 thereon adhered to layer 2 are conveyed through a curing oven 15 so that the adhesive 12 is cured and integrally joins the tiles 10 with the types 11 and layer 2.

Figure 2:
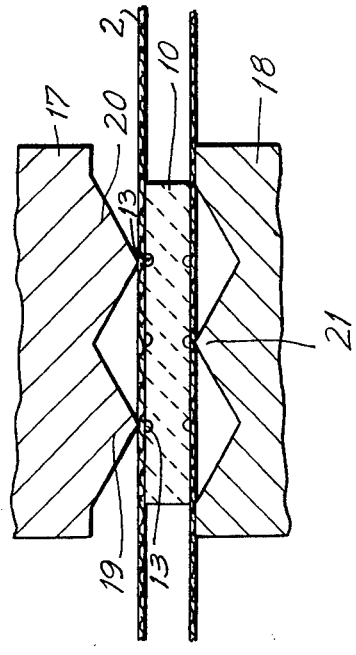
FIG. 2 is a cross-section taken along line 2—2 in FIG. 1.

The tiles 10 then are broken in a tile breaker 16 which comprises an upper die 17 and a lower punch 18 as shown in FIG. 2. The die has a pair of projecting portions 19,20 which are aligned with the tile 10 at the two outermost grooves 13 at the upper surface. The punch has a central projection 21 which is aligned with the central groove in the lower surface of the tile 10. By applying a clamping pressure on the punch and die, the tile 10 will be broken along the score lines to form the successive tile elements 3 as shown in FIG. 3. The grooves extend to a depth in the surface of the tiles 10 of between 0.020 and 0.060 for a tile having a nominal thickness of $\frac{1}{4}$ of an inch. This will ensure substantially straight breakage along the score lines of the tile so that the adjacent tile elements which are formed will have closely adjoining parallel edges. For other thicknesses of the tiles, the depth of the groove of the score lines will be correspondingly adjusted to ensure that the tiles break along the score lines. However, if the tiles do not break along the score lines as shown, for example. at the right in FIG. 3 where a curved breakage line 22 has been shown, the adjoining edges of the adjacent tile elements will still closely conform to one another which will ensure the formation of a substantially continuous inner face for the pipe as shown in FIG. 4B at 23.

As shown in FIG. 1, the tiles 10 are generally of square shape and the tiles are broken into a succession of narrow rectangular tile elements, e.g. four rectangular tiles from each square tile.

By subdividing the tiles 10, it becomes possible to form a multiplicity of tile elements immediately adjacent one another. If it were necessary to lay down the narrow tile elements 3 one after another on the longitudinally advancing tapes 11, careful precision and close attention to the work would be necessary to ensure that the tile elements are immediately adjacent one another. By breaking the larger tiles, the task is greatly simplified since it is only necessary to place the larger tiles 10 closely adjacent one another and, in the illustrated construction, four times as many tile elements are formed and these will be in closely adjacent relation with adjoining conforming edges due to the manner of breakage which has been effected.

Furthermore, in addition to the labor saving effect of only requiring the alignment of relatively large tiles, the cost of large tiles is less than the finished small tiles. Thus, the large tile 10 would be less in cost than four times the cost of smaller tile elements 3. Thus, not only is the placement of the tiles on the tapes simplified due to the reduced number of tiles which must be placed on the tapes, but the cost is ultimately reduced since the use of the larger tiles is more economical.

The assembly of the tapes 11, tile elements 3 and layer 2 exiting from the tile breaker 16 can be wound in a roll and stored for subsequent usage in the formation of the pipe.

The formatlon of the pipe is achieved as follows. Referring to FIG. 5, the composite of layer 2, tile elements 3 and tapes 11 are wound in helical formation on a cylindrical mandrel 30. The illustration in FIG. 5 is exaggerated for effect and in practice, the helical winding angle is much less and is such to provide an advance of the order of one tile for each winding. The winding of the composite is such that the transverse edges 9A of the tile elements in adjacent helical lines are in abutment wlth one another. The longitudinal edges 9 of the tile elements are offset in adjacent rows. The conjoint effect of the helical winding of the tiles and their offset relation in adjacent helical lines provides lines of abutment between tile elements which are broken up and are not in continuous axial lines which could favor deterioration by abrasive or corrosive particles in a conveyed slurry. The mandrel 30 is preliminarily covered with a quantity of epoxy resin which flows through the layer 2 and the gaps and interstices between the tile elements to thoroughly saturate the assembly wound on the mandrel. Optionally, fiberglass strips can be employed to tie down the tile elements onto the mandrel. Also, optional is a secondary application of the epoxy resin to ensure thorough impregnation of all spaces therewith.

The stretchability of the tapes 11, as previously described, is necessary in order to permit the winding of the composite consisting of the tapes 11, tile elements 3 and layer 2 on the mandrel. In particular, as seen in FIG. 4A, adjacent tile elements 3 will be immediately adjacent one another and in order for the tile elements 3 to conform to the curved surface of the mandrel, it is necessary for the tapes 11 to undergo slight stretching. The inner edges of the tile elements will remain in abutment with one another while the outer edges will become slightly spaced apart as shown at gaps 15 in FIG. 4B.

The narrow rectangular shape of the tile elements 3 not only permits the winding onto the mandrel of the composite consisting of layer 2, tile elements 3 and tapes 11, but it also minimizes tile breakage both during winding and also when the tile elements are subjected to impact when they form the inner lining of the pipe for conveying abrasive and corrosive slurries. A preferred value for the length to width ratio of the tile elements is 4:1.

The assembly on the mandrel is then advanced in a pipe-forming device which comprises filament winders 31 and 32. These filament winders are shown respectively as longitudinal and hoop winders but they can also be arranged to wind the filaments at other angles as well. It may also be possible to employ only one winder in which case a single outer winding will be formed in layer 7. Fiberglass filaments are led from the winders 31 and 32 to form the longitudinal and hoop elements 4 and 5 on the pipe as shown in FIG. 4B. Resin is also built-up on the outer surface of the assembly so the thickness of the outer layer 7 reaches a desired value at which the resin will provide the necessary resilient capability to serve as a cushion or shock-absorber for the rigid tile elements lining the inner surface of the pipe. The filament-wound pipe is then conveyed to a curing oven and the resin is cured therein for several hours at a temperature of up to 400° F. The mandrel is then driven out of the pipe to leave the completed pipe.

Although the invention has been described in relation to a specific embodiment thereof, it will become evident that numerous modifications and variations can be made within the spirit and scope of the invention as defined in the appended claims. In the particular disclosure. the actual winding techniques and the composition of the fiberglass and resin do no constitute the subject matter of the invention. The resin can be any suitable thermosetting resin well known in the art and it can be catalyzed with appropriate curing agents or promoters.

What is claimed is:

1. A method of producing a tile-lined pipe comprising adhering tiles in adjoining relation one after another on a longitudinal substrate of stretchable material, subdividing each of the tiles transversely in situ on said substrate to form a plurality of successive independent tile elements from each tile in which each tile element closely comforms to its adjacent tile element along adjoining division edges, and forming a pipe with said tile element lining the inner surface of the pipe, said pipe being formed by winding said substrate on a mandrel and forming said pipe on the wound mandrel in adhered relation with the tile elements and removing the mandrel after the tile elements and pipe are joined together, said pipe being moreover formed on said tile elements by winding fiberglass filaments on said tile elements and joining said filaments and the tile elements with a resin which is applied over and between the tile elements.

2. A method as claimed in claim 1 comprising forming transverse score lines on said tiles to promote the subdivision thereof.

3. A method as claimed in claim 2 wherein said tiles are subdivided by applying force to the tiles to break the same along said score lines.

4. A method as claimed in claim 1 wherein said tiles are initially square and are subdivided into a plurality of narrow rectangular tile elements.

5. A method as claimed in claim 1 wherein the filaments are wound over the tile elements as longitudinal and hoop windings.

6. Apparatus for producing a tile-lined pipe comprising means for longitudinally advancing substrate, means for feeding plurality of tiles and adherently securing the tiles in adjoining relation one after another on said substrate, means for helically winding said substrate with the tiles thereon onto a mandrel, means for applying and binding filaments on the helically wound substrate to form a tile-lined pipe, the mandrel being removed from the pipe after the formation thereof, and means subsequent to said feeding and adhering means for subdividing said tiles in situ on said substrate prior to the helical winding of the substrate on the mandrel, the subdividing means comprising two opposed movable die and punch members having an open position for receiving the substrate with a tile thereon, and a closed position in which the die and punch members apply force to the tiles to subdivide the same transversely, said tiles being formed with score lines to facilitate their subdivision by said subdividing means.

* * * * *